United States Patent

Singer et al.

Patent Number: 6,131,843
Date of Patent: Oct. 17, 2000

[54] SAFETY-BELT RETRACTOR MECHANISM

[75] Inventors: Klaus-Peter Singer; Rene Rade, both of Hamburg; Franz Fugel, Halstenbek; Enno Whitfeld, Hamburg, all of Germany; Arnaud Drouin, Les Andelys, France

[73] Assignee: Autoliv Development AB, Sweden

[21] Appl. No.: 09/011,398

[22] PCT Filed: Jul. 31, 1996

[86] PCT No.: PCT/SE96/00978

§ 371 Date: Apr. 29, 1998

§ 102(e) Date: Apr. 29, 1998

[87] PCT Pub. No.: WO97/04996

PCT Pub. Date: Feb. 13, 1997

[30] Foreign Application Priority Data

Aug. 1, 1995 [DE] Germany .......................... 195 28 115

[51] Int. Cl.[7] .................................................. B60R 22/28
[52] U.S. Cl. ....................................................... 242/379.1
[58] Field of Search ........................ 242/379.1; 280/805, 280/806; 297/470, 471, 472

[56] References Cited

U.S. PATENT DOCUMENTS

| | | | |
|---|---|---|---|
| 4,322,046 | 3/1982 | Tanaka et al. | 242/379.1 |
| 5,618,006 | 4/1997 | Sayles | 242/379.1 |
| 5,794,877 | 8/1998 | Ono et al. | 242/379.1 |
| 5,820,058 | 10/1998 | Hirzel et al. | 242/379.1 |

FOREIGN PATENT DOCUMENTS

| | | |
|---|---|---|
| 0562423 | 9/1993 | European Pat. Off. . |
| 2727470 | 1/1979 | Germany . |
| 4227781 | 2/1994 | Germany . |
| 4331027 | 3/1995 | Germany . |
| 527076 | 5/1971 | Switzerland . |

Primary Examiner—John M. Jillions
Attorney, Agent, or Firm—Robert W. Becker & Associates

[57] ABSTRACT

A safety belt retractor mechanism has a housing and a spool rotatably mounted in the housing. A safety belt is wound onto the spool in a retracted position. A locking mechanism locks the spool in order to prevent further rotation of the spool when an accident occurs. A load-limiting device enables belt pull-out from the spool to a limited extent after activation of the locking mechanism. The load limiting device has a torsion bar having a first and a second end. The torsion bar is connected with the first end to the spool and with the second end to the locking mechanism. A rotation-limiting device for limiting an angle of rotation of the spool relative to the locking mechanism is provided. The locking mechanism has a locking head having a locking element. The locking head is connected to the torsion bar and thereby connects the spool to the locking mechanism. The rotation-limiting device is located between the locking head and an end face of the spool facing the locking head. The rotation-limiting device constitutes a load-transmitting connection between the spool and the locking head after the angle of rotation of the spool relative to the locking head has been completed. A frangible element secures the locking head in a predetermined position on the spool and breaks when subjected to a predetermined force.

23 Claims, 9 Drawing Sheets

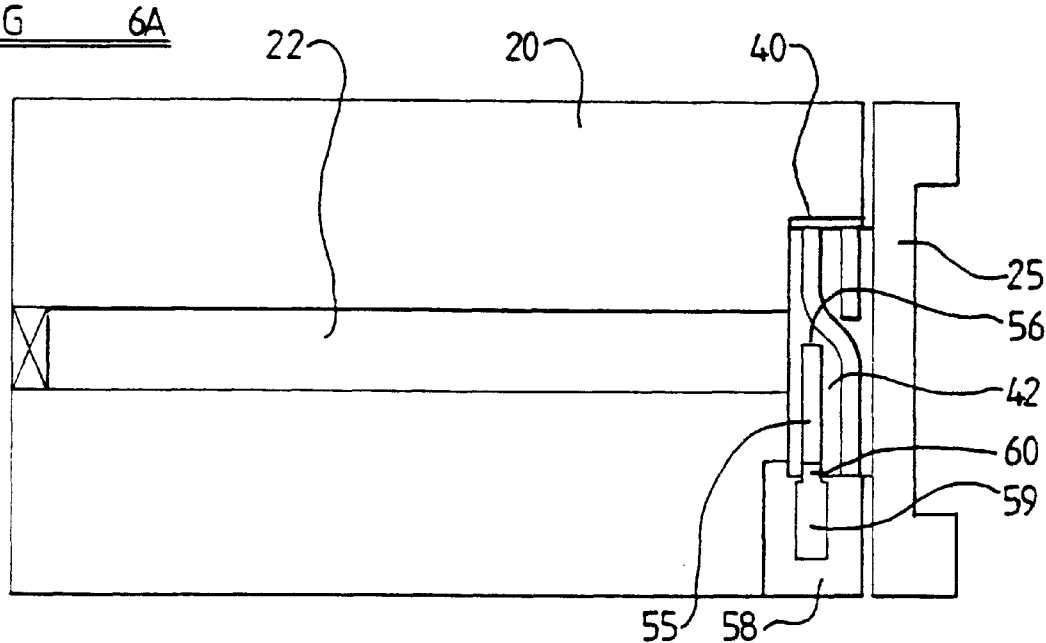
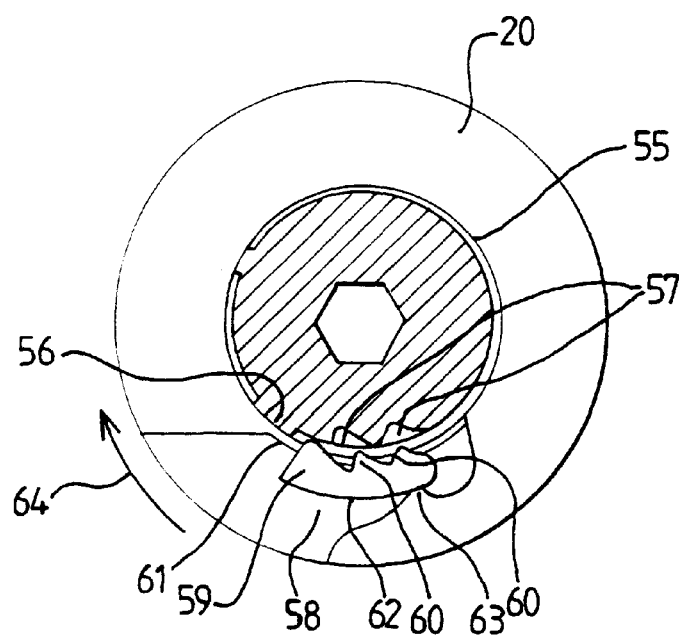

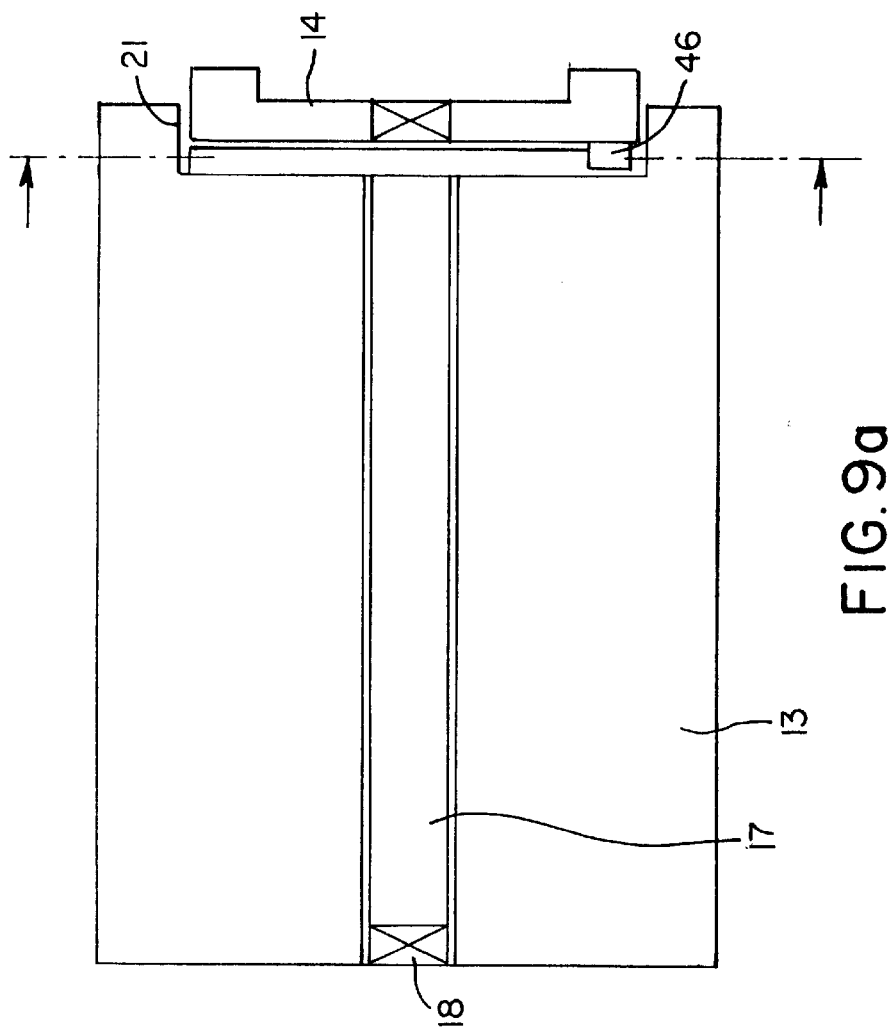
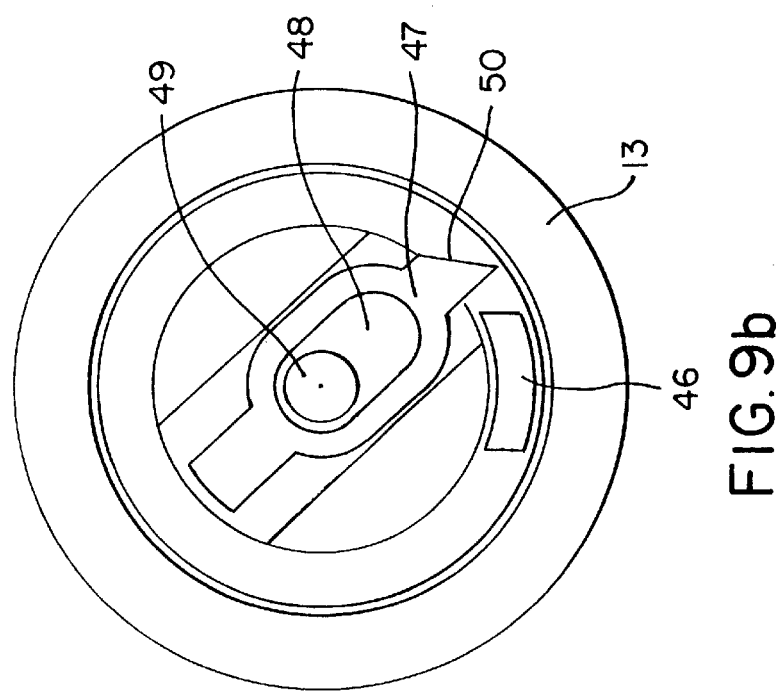

SAFETY-BELT RETRACTOR MECHANISM

BACKGROUND OF THE INVENTION

THE PRESENT INVENTION relates to a safety-belt retractor mechanism for use in a motor vehicle, and more particularly relates to a safety-belt retractor mechanism which incorporates a locking device, which may be actuated in response to vehicle deceleration and/or extraction of the belt from the retractor with a high velocity or high acceleration, the retractor mechanism being provided with a load-limiting device which enables the belt to be pulled out to a limited extent after the locking mechanism has been actuated.

When a vehicle is involved in an accident and decelerates rapidly, an occupant in the vehicle tends to move forwardly, due to inertia. If the occupant is wearing a safety-belt associated with a typical retractor, the safety-belt retractor locks in response to the conditions that exist in such an accident situation, thus preventing more safety-belt from being paid out. The safety-belt is slightly elastic, and thus tends to decelerate the occupant of the vehicle in a gradual manner. However, in certain circumstances, for example an accident occurring at a very high speed, the force applied by the occupant of the vehicle to the safety-belt, and consequently the force applied by the safety-belt to the occupant of the vehicle, is so high that there is a risk of the occupant of the vehicle being injured by the safety-belt. Consequently, it is desirable to provide a retractor mechanism which, when subjected to a substantial force, through the safety-belt, following locking of the mechanism in an accident, permits a further length of safety-belt to be paid out, preferably against a restraining force, which may reduce the risk of injury to the occupant of the vehicle.

It has been proposed to provide a safety-belt locking mechanism which has this property, the retractor mechanism incorporating a load-limiting device which consists of a torsion bar. One end of the torsion bar is connected to the take-up spool of the retractor mechanism, on which the safety-belt is wound, and the other end of the torsion bar is connected to the means which lock the retractor mechanism relative to its housing. Such a device may permit rotation of the take-up spool through a limited angle of rotation subsequent to locking of the retractor.

To prevent an excessive stress being applied to the torsion bar, and to prevent excessive forward displacement of the belted occupant, as a result of excessive angular rotation when the take-up spool moves relative to the locking arrangement, the safety-belt retractor described in DE-A-43 31 027 is provided with a clutch inserted in the load transmission path between the take-up spool and the locking element. This locking element is engaged after the take-up spool or the torque rod has rotated a predetermined number of revolutions in the direction of withdrawal of the safety-belt. Subsequently, the torsion bar becomes inoperative. Consequently, this described arrangement is relatively complicated, and is thus expensive.

A further example of a safety-belt retractor which incorporates a torsion bar in the manner described above is disclosed in DE-A-41 27 781. In the retractor described in this Specification, an automatic locking means is provided in the form of a locking pawl which is actuated by a control system, but which is subsequently de-activated to permit rotation of the take-up spool during a phase of operation in which a load-limiting effect is provided by the torque rod. Subsequently, the spool is again immobilised by a second locking system. This locking system immobilises the spool if additional stress is applied to the system.

Thus, the prior art arrangements are relatively complicated and relatively expensive.

The present invention seeks to provide an improved safety-belt retractor mechanism.

SUMMARY OF THE INVENTION

According to this invention there is provided a safety-belt retractor mechanism comprising a housing, a spool mounted for rotation in the housing upon which a safety-belt may be wound, and a locking system adapted to lock the spool, the spool being associated with a load-limiting device comprising a torsion bar, one end of the torsion bar being connected to the spool, the other end of the torsion bar being connected to a locking head forming part of the locking system, the torsion bar comprising a load-limiting device enabling the belt to be pulled out from the spool to a limited extent after the locking system has been actuated, means being provided for limiting the angle of rotation of the spool relative to the locking head, which are located between the locking head and the spool, and which constitute a load-transmitting connection between the spool and the locking head after a predetermined degree of rotation of the spool relative to the locking head.

Preferably the locking head is initially retained in a predetermined position on the spool by frangible means adapted to break when subjected to a predetermined force.

In one embodiment the means for limiting the angle of rotation comprise a string, cord or cable of a predetermined length, having one end secured to the spool and the other end secured to the locking head so that when the spool rotates relative to the locking head, the string, cord or cable winds around part of the locking head.

Conveniently the string, cord or cable has one end secured to a projection provided on that part of the locking head directed towards the spool.

In one arrangement the spool defines an axially extending bore, the string, cord or cable being initially stored within that axially extending bore.

In an alternative arrangement the string, cord or cable is initially stored in the form of a loose coil in a space between the locking head and the spool.

In another embodiment of the invention the said means for limiting the angle of rotation comprise a threaded axial projection formed on the locking head which is received in a co-operating threaded recess formed on the spool, the recess being of limited axial extent, the arrangement being such that the projection is driven into the recess on rotation of the spool relative to the locking head.

In an alternative embodiment of the invention the means for limiting the angle of rotation comprise a threaded projection formed on the locking head which is threadedly engaged with a threaded nut, the nut being disposed in a recess of predetermined axial extent, formed in the spool, the recess having a cross-section corresponding to the cross-section of the nut so that on rotation of the spool relative to the locking head, the nut moves axially within the recess.

In yet another embodiment of the invention the means for limiting the angle of rotation comprise a projection formed on the locking head which defines a peripheral groove, there being a latch element which is partially engaged in the groove, the latch being adapted to be engaged by the end of the groove as the spool rotates, the latch being adapted to be moved to a latching position as a consequence of the engagement.

Conveniently the latch defines a plurality of teeth and the base of the groove, adjacent said end thereof, defines a plurality of co-operating recesses, the arrangement being such that when the end of the groove engages the latch, the teeth on the latch are brought into engagement with the recesses formed in the base of the groove.

Advantageously the latch is received within a passageway formed in the spool, part of the wall of the passageway engaging a curved face on the latch, the arrangement being such that the said movement of the latch causes the latch to be moved radially inwardly to bring the teeth on the latch into an engagement with the recesses formed in the base of the groove as a consequence of the engagement of the part of the wall of the passageway with the curved part of the latch.

In a further embodiment of the invention the means to limit the angle of rotation comprise a spring biassed latch member carried in a recess formed in the spool and biassed towards the locking head, the spring biassed latch member being adapted to move axially to a locking position after a predetermined movement of the spool relative to the locking head.

Advantageously an intermediate retaining disc is provided located between the locking head and the spool, the spring-biassed latching element initially being biassed into contact with the retaining disc, the retaining disc being adapted to be moved relative to the spool in response to movement of the spool relative to the locking head, the retaining disc defining an aperture, the aperture being located to be brought into alignment with the latching element after a predetermined movement of the retaining disc, the latching element being adapted to pass through the aperture to effect locking of the spool relative to the locking head when the aperture is in alignment with the latching element.

Conveniently the retaining disc is initially secured to the spool by a frangible means, the retaining disc having abutment means thereon adapted to engage co-operating abutment means carried by the locking head subsequent to initial rotation of the spool relative to the locking head.

In yet another embodiment of the invention the means to limit the angle of rotation comprises a toggle mounted on the spool adapted to co-operate with a locking projection carried on the locking head, the toggle having an initial position in which the toggle can pass the projection on rotation of the spool relative to the locking head, with the projection engaging part of the toggle and adjusting the position of the toggle so that subsequently a latching part of the toggle latchingly engages the projection to prevent further rotation of the spool.

Preferably the toggle is pivotally mounted in position on the spool and comprises two arms, one arm of the toggle being initially located to engage the projection provided on the locking head on rotation of the spool relative to the locking head, this engagement causing the toggle to move to the second position in which the other arm of the toggle, which comprises the latching part, subsequently engages the stop.

In yet another embodiment of the invention the means to limit the angle of rotation comprise a shuttle, movable transversely of the locking head and co-operable with an abutment carried by the spool, the shuttle having an initial position in which part of the shuttle defining a cam face projects into a path to be followed by the abutment on rotation of the spool, engagement of the abutment with the cam face causing the shuttle to move to a position in which a further portion of the shuttle extends into the path to be followed by the projection, the arrangement being such that on subsequent rotation of the spool, the projection engages that further portion of the shuttle to form said low transmitting connection.

Conveniently the shuttle is retained within a transverse groove formed in the locking head.

In a further embodiment of the invention the means to limit the angle of rotation comprise projecting means carried by the locking head, adapted to co-operate with projecting means carried by an intermediate plate located between the locking head and the spool, the intermediate plate carrying further projecting means adapted to co-operate with projecting means carried by the spool, the arrangement being such that the said projecting means are carried by the locking head and the intermediate disc, and the projecting means carried by the intermediate disc and the spool, are so located that as the spool rotates, the projecting means on the spool travel a predetermined arcuate distance before engaging the projecting means carried by the intermediate plate, thus entraining the intermediate plate with it, and subsequently, the projecting means on the intermediate plate travel a predetermined arcuate distance before engaging the projecting means on the locking head to complete the provision of a load-transmitting connection.

Conveniently the intermediate plate is held in a predetermined position relative to the spool by frangible means.

In yet another embodiment of the invention the means to limit the angle of rotation comprise a ring element provided in a recess within the spool, the ring element having abutment means adapted to engage corresponding abutment means located within the recess subsequent to a predetermined rotation of the ring, means being provided to clamp the ring to the locking head as a consequence of a movement of the spool relative to the locking head.

Preferably the clamping means comprise a plurality of recesses formed in the outer periphery of the locking head immediately adjacent the ring, each recess containing a roller element, reach recess having at least one inclined wall, the arrangement being such that on relative movement between the ring and the locking head, at least one roller element is caused to move into a constriction defined by the inclined wall and the ring element.

Conveniently the said ring element is associated with a further ring element located to surround the first ring element, the further ring element having abutment means adapted to co-operate with the abutment means provided on the first ring element, and having abutment means adapted to co-operate with abutment means forming part of the wall of the said recess formed in the spool.

In yet another embodiment of the invention the means to limit the angle of rotation comprise a radially outwardly extending projection on part of the locking head which is received within a recess formed on the spool, and a radially inwardly extending projection on the wall of the recess, the said projections being adapted to co-operate to restrict relative movement between the spool and the locking head following a predetermined movement.

Preferably an intermediate element is provided within the inter-space between the said part of the locking head and the said wall of the recess, the projection on the locking head being adapted to pass the projection on the wall of the recess, the intermediate element being dimensioned such that on relative rotation of the spool relative to the locking head, the intermediate element cannot pass either the projection carried on the locking head, or the projection carried on the wall of the recess.

BRIEF DESCRIPTION OF THE DRAWINGS

In order that the invention may be more readily understood, and so that further features thereof may be appreciated, the invention will now be described, by way of example, with reference to the accompanying diagrammatic and schematic drawings in which:

FIG. 6A shows another embodiment of the retractor shaft, locking head and rotation-limiting device;

FIG. 6B is a plan view of the locking head and shaft in FIG. 6A;

FIG. 9A shows another embodiment of the retractor shaft, locking head and rotation-limiting device;

FIG. 9B is a plan view of the locking head and shaft in FIG. 9A;

DESCRIPTION OF PREFERRED EMBODIMENTS

Figure 1:
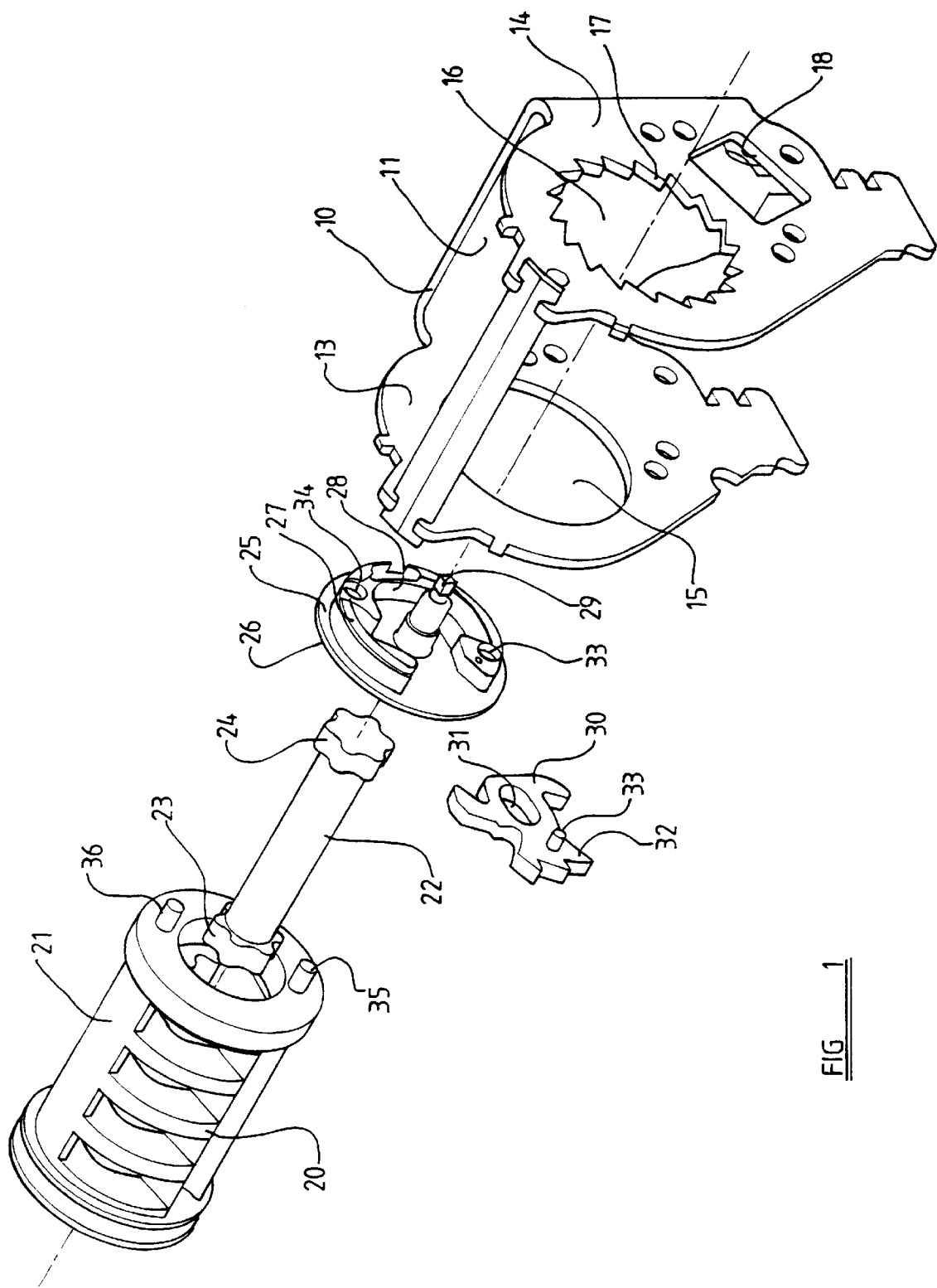
FIG. 1 is a perspective overall exploded view of a safety-belt retractor mechanism which incorporates a load limiting device.

Referring initially to FIG. 1 of the accompanying drawings, a safety belt retractor comprises a U-shaped housing 10 having a base plate 11 supporting forwardly extending spaced apart arm 13,14. The arms 13 defines an aperture 15 and the arm 14 defines an aperture 16 which is co-aligned with the aperture 15, but which has a toothed periphery 17.

The arm 14 defines a further aperture 18 to which a locking mechanism may be connected.

A spool 20 is provided which is of substantially hollow construction, the spool presenting a cylindrical outer face 21. The spool 20 is adapted to have the safety-belt wound on it. The spool is rotatably mounted in the housing 10.

A torsion bar 22 is provided which is received within the hollow interior of the spool 20. The torsion bar 22 has engagement formations 23,24 formed on the opposed ends thereof. Engagement formation 23 is engaged with a co-operating part of the spool 20. The engagement formation 24 is engaged with a co-operating part of a locking head 25. The locking head 25 is in the form of a disc 26 which has an axially extending projection 27 formed on a face thereof directed away from the main body of the spool which defines a recess 28. The recess 28 surrounds stub shaft 29 which is formed integrally with the locking head. The recess 28 is designed to accommodate a pivotally movable locking element 30. The locking element 30 has an oval aperture 31 formed therein which receives the stub shaft 29. The locking element 30 is provided with a radially projecting tooth 32 and an axially extending peg 33a which is adapted to co-operate with the locking mechanism.

The locking head 25 defines two apertures 33,34 which are diametrically opposed and which are intended to receive axially projecting shear pins 35,36 which are formed on one end face of the spool 20 when the components are joined together. The spool 20 is intended to be received within the U-shaped housing 10 located between the forwardly extending arms 13,14, with the locking head 25 and the locking member 30 lying in the plane defined by the apertures 16 present in the arm 14.

When a safety-belt wound on the spool 20 is withdrawn from the spool 20, and should the appropriate sensor means which are well known in the art, sense an accident situation, the projecting pin 33a is acted upon in order to move the locking member 30 so that the tooth 32 carried by the locking member 30 engages one of the teeth formed at the further periphery 17 of the aperture 16, thus locking the spool and preventing further safety-belt from being extracted from the retractor mechanism.

However, if a substantial force is applied to the safety-belt, the shear pins 35,36 may be snapped off, thus permitting the spool 20 to rotate whilst applying a torque to the torsion bar 22. As the spool 20 continues to rotate, the torsion bar 22 resists the movement of the spool 20, whilst permitting the movement, provided that the force applied to the spool by the safety-belt is sufficiently large. Thus the spool 20 rotates and provides a load-limiting effect.

As will become clear from the following description, a number of different embodiments have been devised which permit rotation of the spool 20 only by a predetermined extent relative to the locking head 25, the mechanisms then serving to prevent further movement of the spool 20 relative to the locking head 25.

Figure 2:
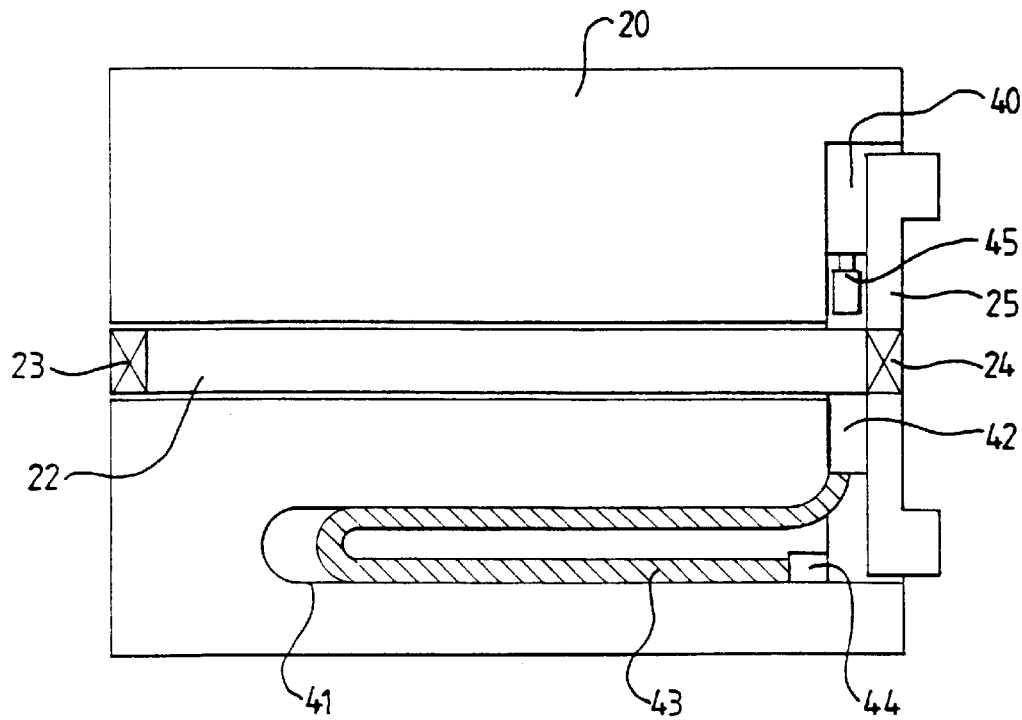
FIG. 2 is a diagrammatic side view of the retractor shaft, locking head and rotation-limiting device of one embodiment.

Referring to FIG. 2 of the accompanying drawings, a spool 20, torsion bar 22 and locking head 25 are schematically illustrated.

The locking head 25 is received partly within a generally cylindrical recess 40 provided in the end face of the retractor spool 20. A further recess 41 is provided which extends axially within the spool 20, the further axial recess 41 extending from the base of the first recess 40.

A cylindrical boss 42 is provided on the under-side of the locking head 25, the cylindrical boss being received within the cylindrical recess 40.

A cable string or cord 43 is provided which is initially accommodated in a doubled-up manner within the axially extending recess 41. One end 44 of the string, cord or cable 43 is secured to the spool 20 at a position adjacent the junction between the recess 40 and the recess 41. The other end 45 of the string, cord or cable 43 is connected to the cylindrical boss 42.

When the spool 20 begins to rotate relative to the locking head 25, thus applying a torque to the torsion bar 22, the string, cord or cable 43 will become wound round the cylindrical boss 42. The string, cord or cable 43 will thus be withdrawn from the axially extending recess 41. After the spool 20 has effected a predetermined rotation relative to the locking head 25, the string, cord or cable will be tight and will provide a load-transmitting connection between the locking head 25 and the spool 20 which prevent further movement of the spool 20.

Figure 3A:
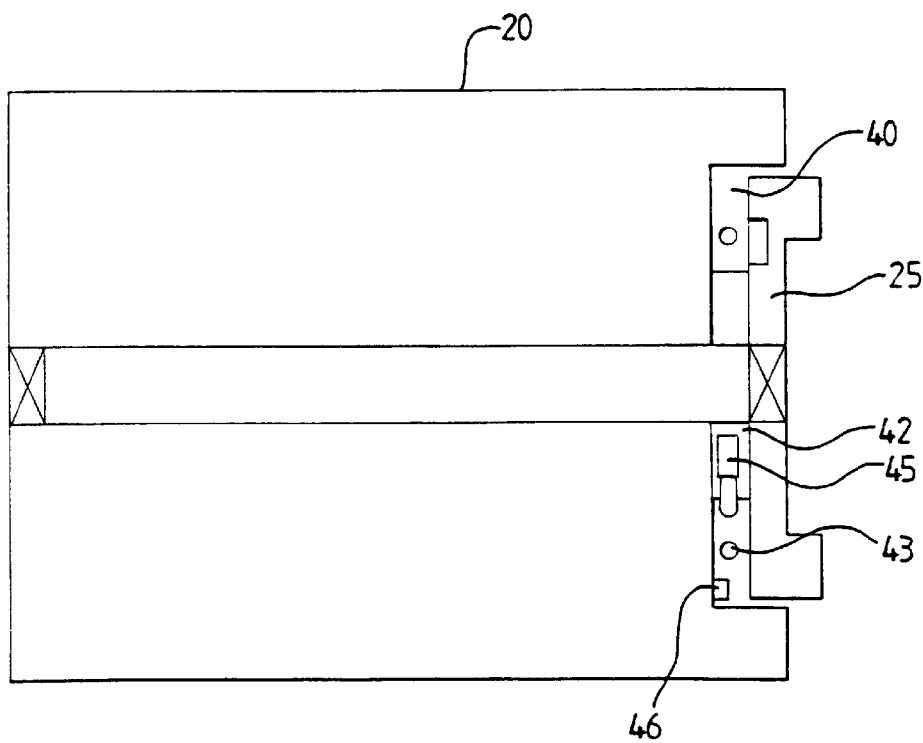
FIG. 3A shows another embodiment of the retractor shaft, locking head and rotation-limiting device.
Figure 3B:
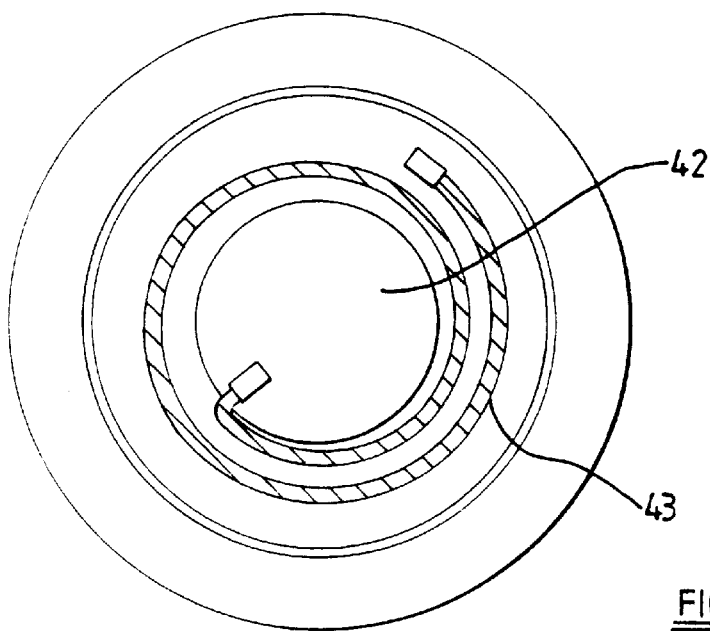
FIG. 3B is a plan view of the locking head and shaft in FIG. 3A.

FIGS. 3A and 3B illustrate a further embodiment of the invention which is similar, in many respects, to the embodiment of FIG. 2.

In the embodiment of FIGS. 3A and 3B, the locking head 25 again has an axially extending boss 42 which is received within a recess 40 formed in the end face of the spool 20. A string, cord or cable 43 is provided which has one end, 45, secured to the boss 42. However, in this embodiment, the string, cord or cable 43 is wound in a loose spiral around the boss 42, the other end 46 of the string, cord or cable being secured to the base of the recess 40, and thus being connected directly to the spool 20.

In this embodiment, when the spool 20 begins to rotate relative to the locking head 25, the string, cord or cable is wound more tightly around the cylindrical boss 42, until it forms a load-transmitting connection between the spool 20 and the locking head, thus preventing further rotational movement of the spool 20.

Figure 4:
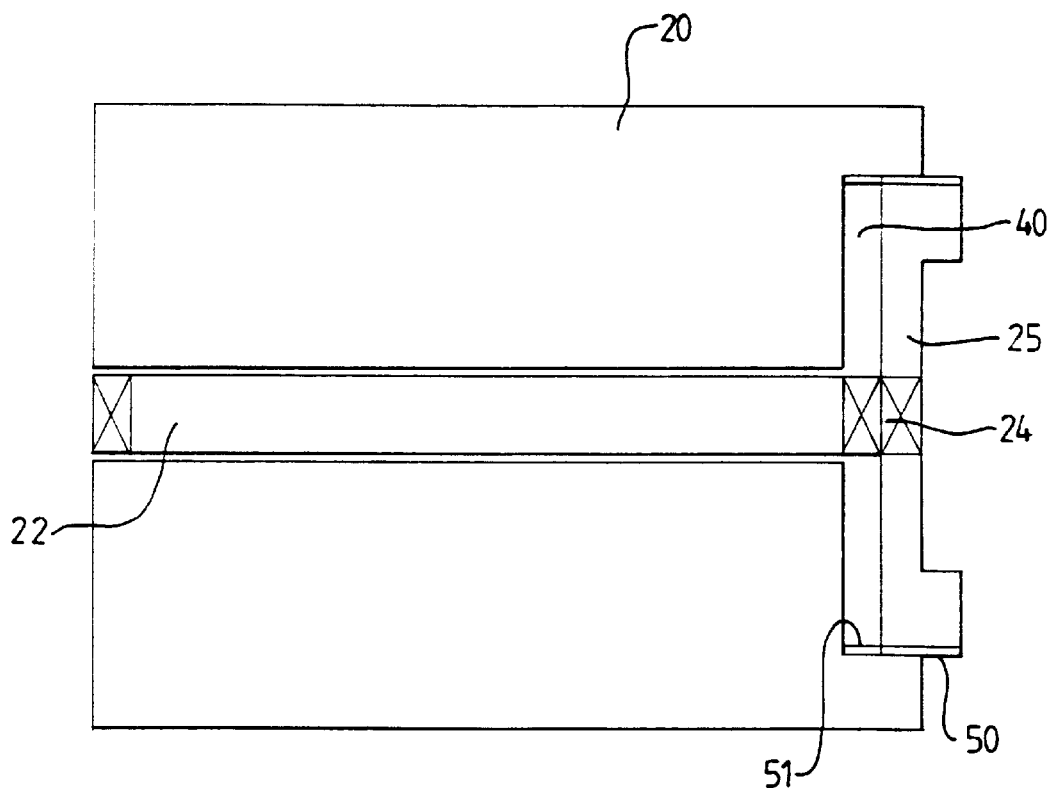
FIG. 4 shows another embodiment of the retractor shaft, locking head and rotation-limiting device.

FIG. 4 illustrates a further embodiment of the invention. In this embodiment, one end face of the spool 20 is provided with a generally cylindrical recess 40. The locking head 25 is partly received within the recess 40. However, the outer periphery of the locking head is threaded 50, and the outer periphery of the recess 40 is also threaded 51, the threads 50 and 51 inter-engaging. The locking head 25 is mounted for axial movement relative to the torsion bar 22. The engagement formation 24 provided on the torsion bar is in the form of a sliding key-way which co-operates with the locking head.

When the spool 20 begins to rotate relative to the locking head 25, because of the inter-engagement of the threads 50 and the threads 51, the locking head 25 moves axially, relative to the spool 20, moving into the recess 40. After a predetermined movement of the spool 20 relative to the locking head 25, the locking head 25 engages the base of the recess 40, thus preventing further rotational movement of the spool 20 relative to the locking head 25. The engagement of the locking head 25 at the base of the recess 40, and the mechanical inter-connection provided by the inter-engaged threads 50 and 51 provides a load-transmitting connection which prevents further rotation of the spool 20.

Figure 5B:
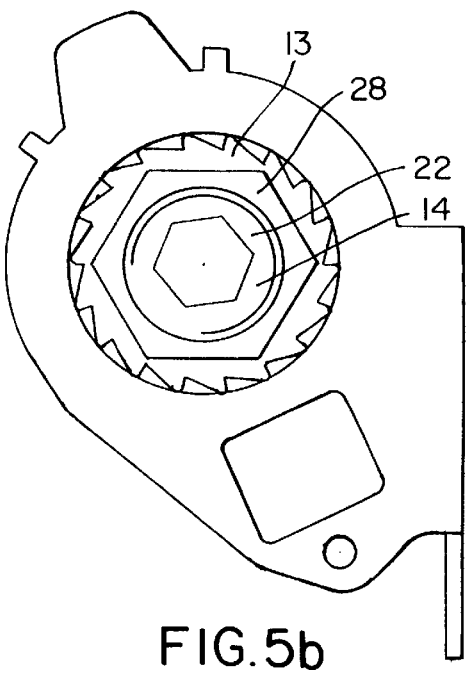
FIG. 5B is a plan view of the locking head and shaft in FIG. 5A.
Figure 5A:
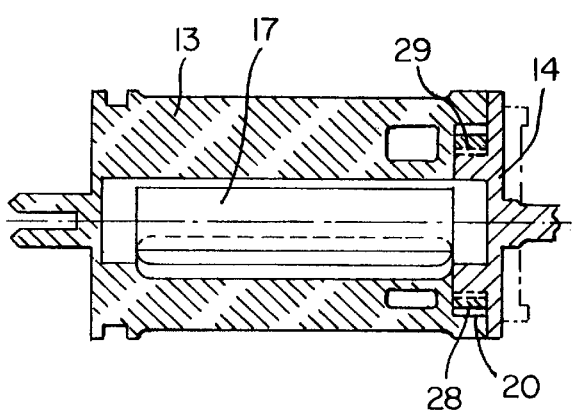
FIG. 5A shows another embodiment of the retractor shaft, locking head and rotation-limiting device.

FIGS. 5A and 5B illustrate a further embodiment of the invention which incorporates a threaded inter-connection. In this embodiment of the invention, the locking head 25 has a projecting boss 42. The external part of the boss 42 is threaded 50. The threading 50 co-operates with threading 51 provided in a central bore of hexagonal nut 52. The hexagonal nut 52 is received within a hexagonal recess 53 formed within the end face of the spool 20 of the retractor mechanism. Initially the nut 52 is located at a position spaced away from the base of the recess 53. When the spool 20 rotates relative to the locking head 25, the nut is driven axially by the co-operation between the threads 50 and the threads 51 until the nut engages the base of the recess 53, which is the condition illustrated in FIG. 5a. When in this position, the nut provides a load-transmitting connection between the retractor spool 20 and the locking head 25.

FIGS. 6A and 6B illustrate a further embodiment of the invention. In this embodiment, the locking head 25 is provided with a boss 42 which extends into a recess 40 formed in the end face of the spool 20. A generally helical groove or recess 55 is provided which is formed in the exterior of the boss 42. As will become clearer hereinafter, at the end of the groove there is effectively provided a stop 56. Adjacent the end of the groove, the base of the groove is more deeply recessed to form a pair of depressions 57.

A part of the recess 40 is extended radially outwardly to form a communicating passage 58 which is of a complex shape. Mounted within this passage 58 is a latch member 59 which has a plurality of teeth 60 of a complimentary shape to the shapes of the recesses 57. The teeth are engaged within the helical groove 55, but not so deeply engaged as to engage the base of the groove. The latch 59 is held in position by a frangible element 61.

An outer surface of the latch element 59 is arcuately curved 62 and engages a projection 63 forming part of the boundary wall defining the passage 58.

When the spool 20 rotates relative to the locking head 25, the spool will effect a rotation in the sense illustrated by the arrow 64 in FIG. 6B. When this rotary motion is effected, the latch 59 is effectively caused to slide along the helical recess 55, starting at one end of the recess and finally approaching the far end of the recess which is the condition illustrated in FIG. 6b. As the spool 20 continues to move, from the position illustrated in FIG. 6b, the stop 56, which is effectively the end of the helical groove 55, engages the latch 59, dis-engages the latch 59 from the frangible element 61 and, as a consequence of the subsequent movement of the latch 59 and the action of the projection 63 on the latch 59, the latch is driven radially inwardly so that the projecting teeth 60 on the latch securely engage the recesses 57 formed in the base of the helical groove 55. The latch then firmly engages the terminal part of the passage 58 and forms a load-transmitting connection which prevents further rotation of the spool 20 relative to the locking head 25.

Figure 7A:
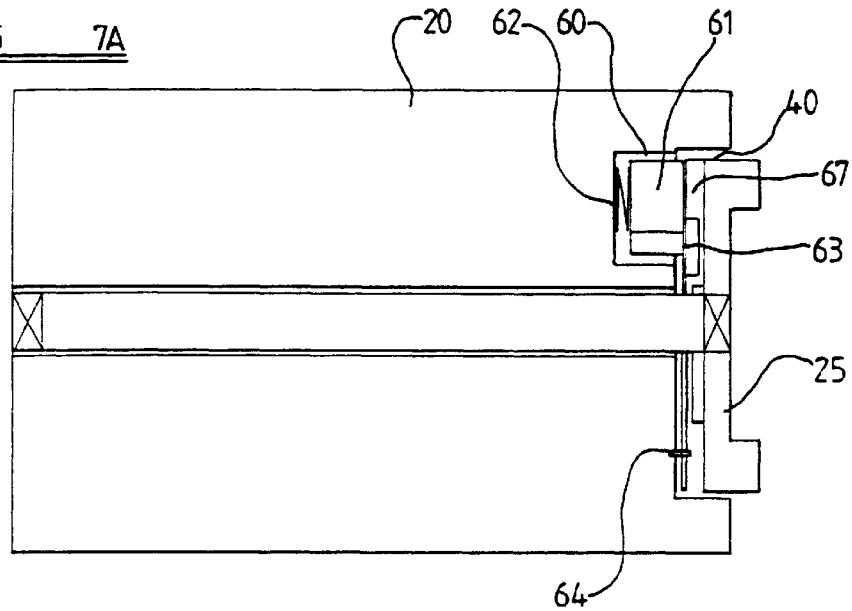
FIG. 7A shows another embodiment of the retractor shaft, locking head and rotation-limiting device.
Figure 7B:
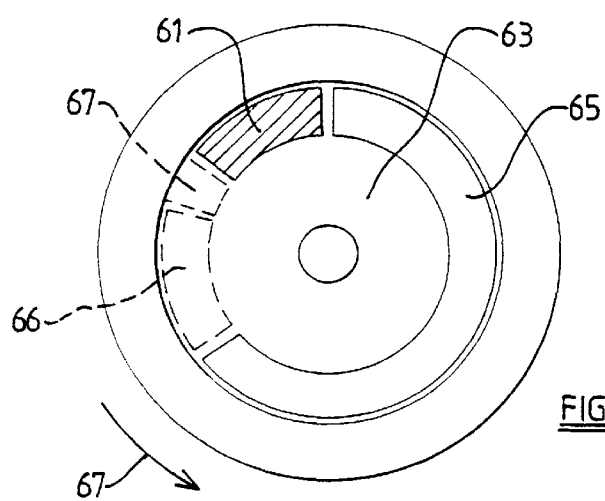
FIG. 7B is a plan view of the locking head and shaft in FIG. 7A.

FIGS. 7A and 7B illustrate yet another embodiment of the invention.

In the embodiment of FIG. 7A and 7B, the spool 20 of the retractor has a recess 40 formed in one end face thereof, the recess 40 being associated with a further axially extending recess 60, which accommodates an axially movable latching element 61 which is biassed out of the recess by means of a spring 62 located between the base of the recess 60 and the latch element 61. The latch element 61 is retained in an initial position, in which the spring 62 is compressed, by means of a substantially circular retaining disc 63 which is located substantially parallel with the base of the recess 40. The retaining disc 63 is secured to the spool 20 by means of a shear pin 64.

As shown in FIG. 7B, the retaining disc 63 is provided with an arcuate aperture 65 adjacent the periphery thereof, which is co-aligned with the latch element 61, and which has an equivalent width. The latch element 61 is arcuate, and can thus extend through the aperture 65.

The retaining plate 63 is provided with a projection 66 which extends from the side of the retaining plate 63, which is opposed to the side which engages the latch 61.

The locking head 25 is provided with an axially extending projection 67 which is co-aligned with the projection 66 carried by the retaining plate 63.

In operation of the device illustrated in FIGS. 7A and 7B, when the spool 20 commences to rotate, relative to the locking head 25, in the direction indicating by arrow 67, the retaining plate rotates with the spool, and the projection 66 thus moves away from the projection 67. However, after almost one complete revolution, the projection 66 re-encounters the projection 67 and the two projections engage. The shear pin 64 then breaks, the latch 61 then slides relative to the retaining disc as the spool 20 and the latch 61 continue to rotate relative to the locking head 25 and the now stationary retaining plate 63. When the latch 61 becomes co-aligned with the aperture 65, the spring 62 forces the latch 61 through the aperture 65. The latch then engages the under-surface of the locking head 25. The spool 20 continues to rotate until the latch 61 reaches the far end of the recess 65. Further movement of the latch is then prevented, and the combination of the latch, the retaining plate and the inter-engaged projections 66 and 67 comprises a load-transmitting connection between the spool 20 and the locking head 25.

Figure 8:
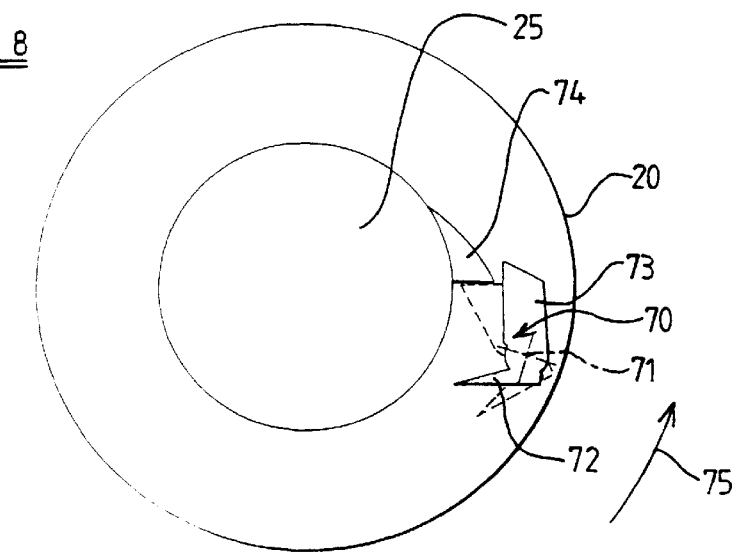
FIG. 8 is a plan view of the shaft locking head and rotation-limiting device.

FIG. 8 illustrates another embodiment of the invention in which the end face of the spool 20 carries a toggle element 70 which is mounted for pivotal movement about a pivot axis 71. The toggle element has two arms 72,73 which are located substantially at right angles to each other. The toggle is adapted to co-operate with a radial projection 74 provided on the locking head 25.

The toggle 70 is initially in the condition illustrated in FIG. 8. The projection 74 may initially be located adjacent the toggle, and when the spool 20 begins to rotate relative to the locking head 25, the spool 20 will rotate in the direction of the arrow 75 and may effect a substantial rotation before the condition illustrated in FIG. 8 is reached. It will be understood, from a consideration of FIG. 8, that as the spool 20 continues to rotate in the direction of the arrow 75, the projection 74 will engage the arm 72 of the toggle 70, thus moving the toggle to the position shown in dotted lines in FIG. 8. After a complete revolution of the spool relative to the locking head 25, the arm 73 of the toggle will then engage the projection 74 in a locking manner, thus providing a load-transmitting connection between the spool and the locking head.

FIGS. 9A and 9B illustrate another embodiment of the invention. In this embodiment of the invention, the locking head 25 is partly received within a recess 40 formed in the end face of the spool 20. The locking head 25 carries an axially extending projection 80 adjacent its radial outer edge. The projection 80 is received within an annular groove 81 formed in the base of the recess 40. The central part of the recess 40 defines a transversely extending channel 82 which receives a slidable shuttle member 83. The slidable shuttle member 83 has an enlarged oval central aperture 84 through which passes part of the torsion bar 22. The shuttle member 83 has a first end 85 which projects into the annular channel 81, and which has an inclined cam face 86. The other end 87 of the shuttle is initially received within the transverse groove 82.

On rotation of the spool 20 in the direction illustrated by the arrow 88, the spool, together with the shuttle will rotate from the initial position illustrated in FIG. 9b, the projecting end 85 of the shuttle thus being moved away from the projection 80 formed on the stationary locking head 25. After almost one revolution has been completed, the cam face 86 will engage the projection 80. The shuttle will thus be moved diametrically, the end 87 of the shuttle opposed from the end 85 carrying the cam face 86 thus being moved to a position in which it extends from the transverse groove 82 and extends across the annular channel 81. Continuing rotation of the spool brings the then projecting end 87 of the shuttle into engagement with the projection 80 carried by the stationary locking head 25, thus forming a load-transmitting connection between the spool and the locking head, and preventing further rotational movement of the spool.

Figure 10A:
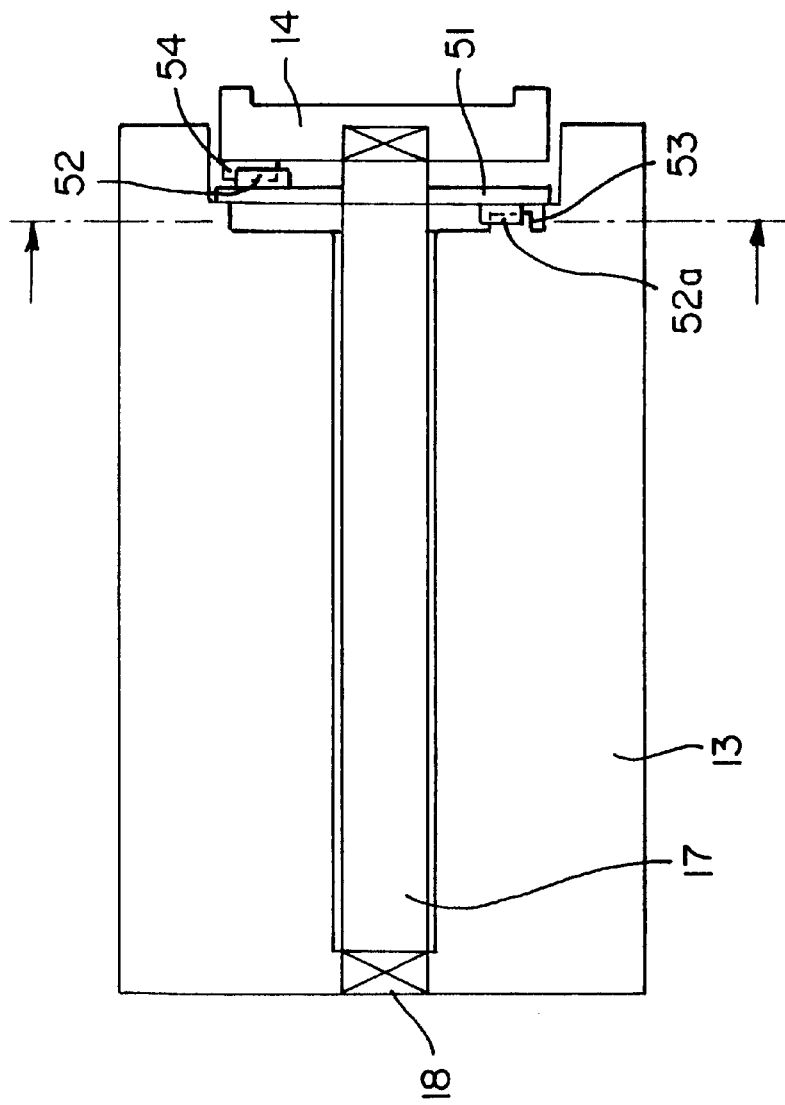
FIG. 10A shows another embodiment of the refractor shaft, locking head and rotation-limiting device.
Figure 10B:
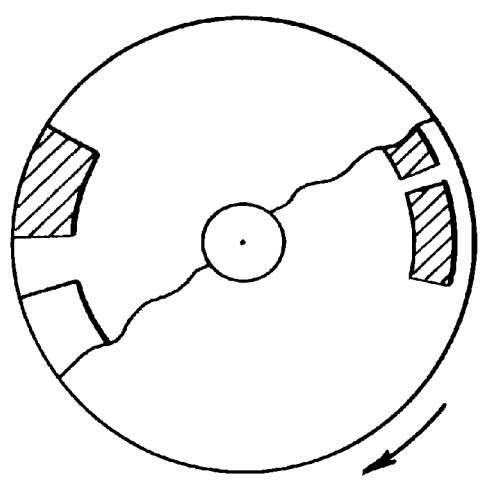
FIG. 10B is a plan view of the locking head and shaft in FIG. 10A.

FIGS. 10A and 10B illustrate a further embodiment of the invention. In this embodiment of the invention, the locking head 25 is received within a recess 40 formed in one end face of the spool 20. An axially extending projection 90 is formed on the locking head 25 extending towards the recess. Received within the recess is an intermediate plate 91. The intermediate plate 91 carries, on one side, an axially extending projection 92 which extends towards the locking head 25 and which is located adjacent the projection 90. The intermediate plate 91 also carries, on the other side thereof, a further projection 93 which extends towards the base of the recess 40, there being a further projection 94 carried on the base of the recess and extending up towards the intermediate plate 91, the further projection 94 being located adjacent the projection 93. A frangible web 95 is provided which initially retains the intermediate plate 91 in the illustrated position.

When the spool 20 commences its rotation relative to the locking head 25, in the direction indicated by the arrow 96, initially the intermediate plate 91 co-rotates with the spool 20, and thus the projection 92 moves away from the projection 90. However, after almost a complete lap, the projection 92, carried by the intermediate plate 91, engages the projection 90 carried by the stationary locking head 25. The intermediate plate 91 thus becomes stationary and the frangible web 95 breaks. The projection 93 on the under-side of the intermediate plate 91 is thus now stationary, and the projection 94, carried by the spool 20 moves away from the projection 93, and after a further, virtually complete, revolution of the spool 20, the projection 94 engages the projection 93. The inter-engagement of the four projections, thus constitutes a load-transmitting connection between the spool 20 and the locking head 25.

Figure 11:
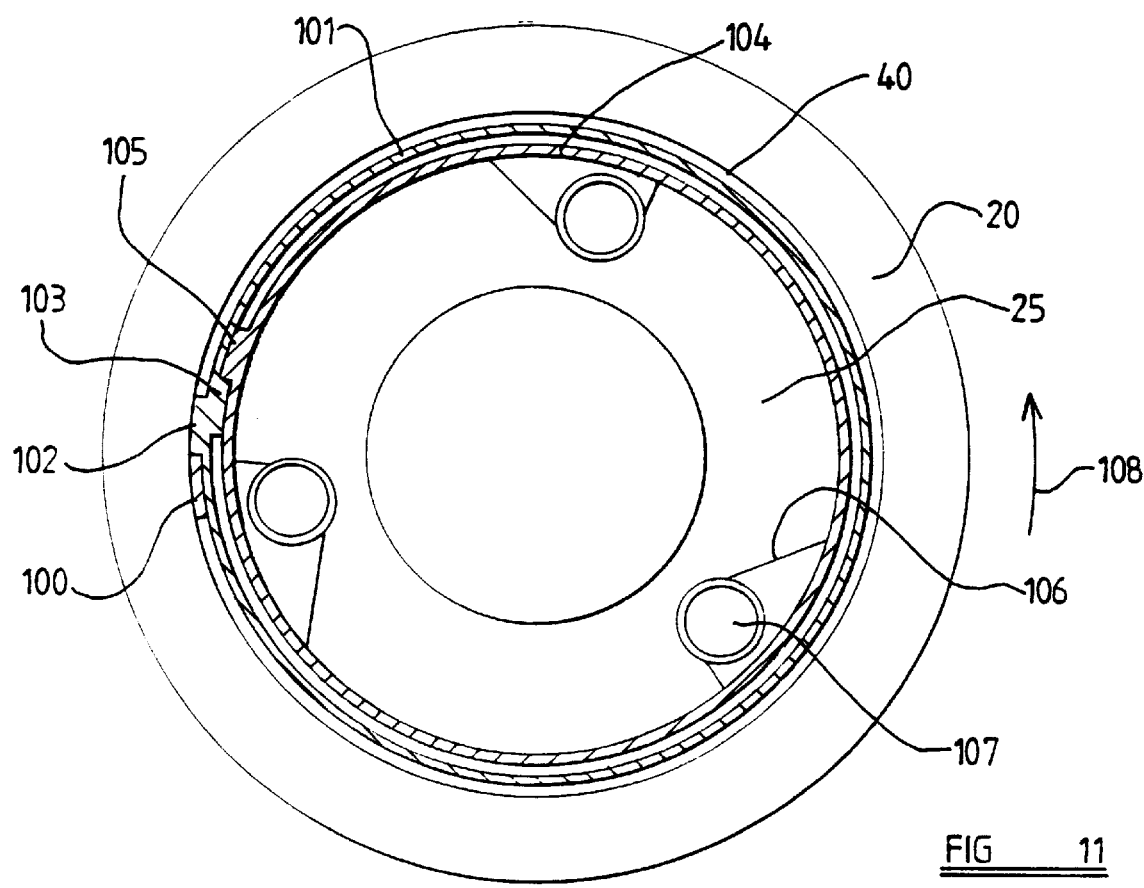
FIG. 11 is a plan view of the shaft, locking head and rotation-limiting device.

FIG. 11 illustrates a further embodiment of the invention. In the end face of the spool 20 is formed a recess 40. An abutment 100 is provided which projects inwardly from the exterior wall of the recess 40. A first slidable ring 101 is provided which is located within the recess and is capable of executing a sliding rotational motion. The ring 101 has a radially outwardly directed abutment 102 which is illustrated as being in contact with the abutment 100. The ring 101 also has a radially inwardly directed abutment 103.

A second rotationally slidable ring 104 is provided which is of a lesser diameter than the ring 101. The ring 104 is provided with a radially outwardly directed abutment 105 which is shown as being in engagement with the abutment 103. Contained within the inner ring 104, is the locking head 25. Formed in the outer periphery of the circular locking head are a plurality of generally "V"-shaped recesses 106. Each recess has one wall which extends substantially radially and another wall is more inclined towards the tangential. Received within each recess 106 is a roller clamping element 107.

Although the rings 101 and 104 are capable of rotation, they are retained in their initial position relative to the spool 20 by friction, and thus the combination of the rings 101 and 104 co-rotate relative to the locking head 25 when the spool 20 begins to rotate in the direction illustrated by the arrow 108. Although, in the figure, each of the rollers 107 is at the base of the respective recess 106, one or other of the rollers would be in contact with the inner ring 104. As the ring 104 rotates in the direction indicated by the arrow 108, the ring will entrain one or more of the rollers 107, causing the rollers to move to the narrowing end of the recess defined by the wall which is inclined relative to the radius. The roller will form a clamping engagement between the recess in the outer periphery of the locking head 25 and the ring 104 thus preventing further rotation of the ring 104 relative to the stationary locking head 25.

The inner ring 104 is thus retained in a fixed position in which it rotates no more. The outer ring 101, however, continues to rotate with the spool 20. The abutment 103 becomes separated from the abutment 105, and completes virtually a complete revolution before the abutment 103 engages the other side of the abutment 105. The outer ring 101 can then rotate no more. The abutment 100 then becomes separated from the abutment 102 as the spool continues to rotate. After almost a complete revolution, the abutment 100 re-encounters the other side of the abutment 102 and can then rotate no more. The combination of the locking rollers and the rings, thus forms a load-transmitting connection between the spool and the locking head.

Figure 12B:
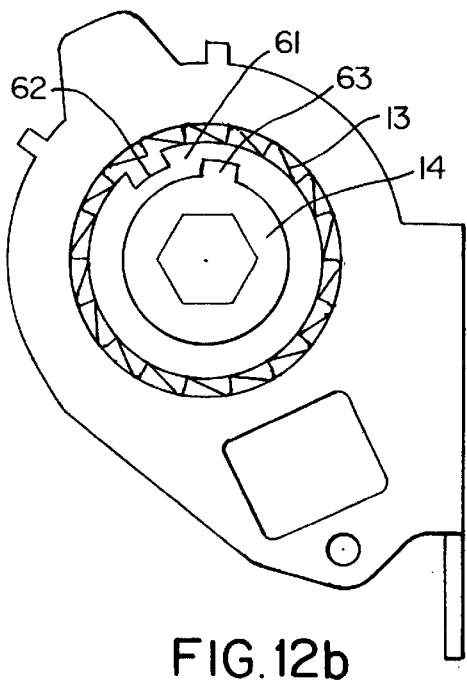
FIG. 12B is a plan view of the locking head and shaft in FIG. 12A.
Figure 12A:
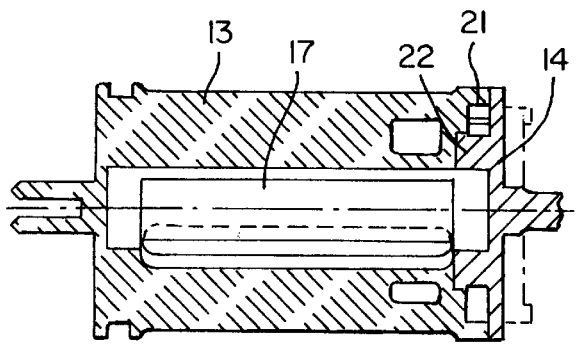
FIG. 12A shows another embodiment of the retractor shaft, locking head and rotation-limiting device.

FIGS. 12A and 12B illustrate a further embodiment of the invention. One end face of the spool 20 defines a recess 40 and a boss 42 carried by the locking head 25 projects into that recess. The boss 42 carries a radially outwardly extending abutment 110. The outer periphery of the recess 40 is provided with a radially inwardly directed abutment 111, and an intermediate element 112 is provided in the inter-space 113 between the boss 42 and the outer wall of the recess 40.

It is to be noted that the abutment 110 has such a radial extent, and the abutment 111 has such a radial extent that the rotation of the spool 20 relative to the locking head 25, the abutments 110 and 111 may pass each other.

If the apparatus is in the initial condition as illustrated in FIG. 12B, the intermediate element 112 is in engagement with both the abutment 110 carried by the locking head and the abutment 111 carried by the spool. If safety-belt is withdrawn from the spool, the spool rotates in the direction illustrated by the arrow 113. The abutment 111 thus becomes separated from the intermediate element 112 and completes virtually a revolution before passing the abutment 110, which is stationary, and re-encountering the intermediate element 112 from the other side. The intermediate element 112 is thus entrained to rotate in the inter-space 113 between the locking head 25 and the inner wall of the recess 40 by the force applied thereto by the radially inwardly directed abutment 111. As the spool 20 continues to rotate in the direction illustrated by the arrow 113, the inwardly directed abutment 111 and the intermediate element 112 co-rotate with the spool 120 until the intermediate element 112 re-encounters the radially outwardly directed abutment 110 carried by the locking head. Further rotation of the spool is then prevented because the combination of the abutments 110 and 111, together with the intermediate element 112 form a load-transmitting connection between the spool and the locking head.

The present invention is, of course, in no way restricted to the specific disclosure of the specification and drawings, but also encompasses any modifications within the scope of the appended claims.

What is claimed is:

1. A safety belt retractor mechanism comprising:

a housing;

a spool rotatably mounted in said housing;

a safety belt wound onto said spool in a retracted position;

a locking mechanism locking said spool in order to prevent further rotation of said spool when an accident occurs;

a load-limiting device enabling belt pull-out from said spool to a limited extent after activation of said locking mechanism;

said load limiting device comprising a torsion bar having a first and a second end;

said torsion bar connected with said first end to said spool and with said second end to said locking mechanism;

a rotation-limiting device for limiting an angle of rotation of said spool relative to said locking mechanism;

said locking mechanism comprising a locking head having a locking element;

said locking head connected to said torsion bar and thereby connecting said spool to said locking mechanism;

said rotation-limiting device located between said locking head and an end face of said spool facing said locking head;

said rotation-limiting device constituting a load-transmitting connection between said spool and said locking head after said angle of rotation of said spool relative to said locking head has been completed;

frangible means securing said locking head in a predetermined position on said spool and adapted to break when subjected to a predetermined force.

2. A retractor mechanism according to claim 1, wherein said rotation-limiting device comprises a string, a cord or a cable of a predetermined length having a first and a second end, wherein said first end is secured at said spool and said second end is secured at said locking head so that, when said spool rotates, said string, said cord or said cable is wound about a part of said locking head.

3. A retractor mechanism according to claim 2, wherein said locking head has a projection on a side facing said spool and wherein said second end of said string, said cord, or said cable is connected to said projection.

4. A retractor mechanism according to claim 2, wherein said spool has an axially extending bore in which said string, said cord or said cable is initially stored.

5. A retractor mechanism according to claim 2, wherein said string, said cord or said cable is stored in a loop in a space between said spool and said locking head.

6. A retractor mechanism according to claim 1, wherein said rotation-limiting device comprises a threaded axial projection formed on said locking head and a threaded recess provided in said spool, wherein said threaded projection engages said threaded recess and wherein said threaded recess has a limited axial extent defining said angle of rotation of said spool relative to said locking head.

7. A retractor mechanism according to claim 1, wherein said rotation-limiting device comprises a threaded axial projection formed on said locking head, a recess in said spool having a limited axial extent, and a threaded nut inserted in said recess, wherein said threaded projection engages said threaded nut and wherein said threaded nut has a cross-section matching a cross-section of said recess so that upon rotation of said spool relative to said locking head said threaded nut is moved axially within said recess that defines said angle of rotation by said limited axial length.

8. A retractor mechanism according to claim 1, wherein said rotation-limiting device comprises a projection, formed on said locking head and defining a peripheral groove, and a latch element guided in said groove, wherein upon rotation of said spool by said angle of rotation said latch element is moved in said groove to an end of said groove and, when abutting at said end of said groove, is moved into a latching position.

9. A retractor mechanism according to claim 8, wherein said latch element comprises a plurality of teeth and wherein said groove has a plurality of recesses adjacent to said end of said groove, wherein in said latching position said teeth engage said recesses.

10. A retractor mechanism according to claim 9, wherein said spool has a passageway in which said latch element is received and wherein said latch element has a curved face engaged by a wall of said passageway, wherein upon rotation of said spool said latch element is moved radially inwardly by said wall of said passageway acting on said curved face to thereby move said teeth into engagement with said recesses.

11. A retractor mechanism according to claim 1, wherein said spool has a recess and wherein said rotation-limiting device comprises a latch member and a spring, wherein said latch member is positioned in said recess of said spool and said spring is positioned between a bottom of said recess and said latch member and biases said latch member in a direction toward said locking head, wherein said latch member upon rotation of said spool by said angle of rotation is moved into a locking position at said locking head.

12. A retractor mechanism according to claim 11, further comprising an intermediate retaining disc located between said locking head and said spool and having an aperture, wherein said retaining disc is moveable relative to said spool when said spool moves relative to said locking head, wherein said latch element is initially forced against said retaining disc by said spring and, when said spool is moved by said angle of rotation, said latch element passes through said aperture of said retaining disc and locks said spool relative to said locking head.

13. A retractor mechanism according to claim 12, wherein said retaining disc is initially secured at said spool by a frangible element, wherein said retaining disc has a first abutment and wherein said locking head has a second abutment, wherein said first and second abutment rest at one another after said spool has been rotated by said angle of rotation.

14. A retractor mechanism according to claim 1, wherein:
said rotation-limiting device comprises a toggle mounted on said spool;
said locking head has a locking projection cooperating with said toggle;
said toggle has a latching part;
said toggle has an initial position and in said initial position said toggle passes said locking projection upon rotation of said spool relative to said locking head whereby said locking projection moves said latching part of said toggle into a latching position;
wherein upon further rotation of said spool said latching part engages said locking projection.

15. A retractor mechanism according to claim 14, wherein said toggle is pivotally mounted on said spool and comprises a first and a second arm, wherein in said initial position said first arm is in a travel path of said locking projection and said toggle is moved by said locking projection upon rotation of said spool into said latching position in which said second arm engage said locking projection upon further rotation of said spool.

16. A retractor mechanism according to claim 1, wherein:
said rotation-limiting device comprises a shuttle mounted in a transverse groove of said locking head so as to be transversely moveable across said locking head;
said spool has an abutment following a travel path when said spool is rotated;
said shuttle has a cam face;
in an initial position of said shuttle, said cam face projects into said travel path of said abutment;
upon rotation of said spool, said abutment pushes said toggle by contacting said cam face into a second position in which a part of said shuttle projects into said travel path;
upon further rotation of said spool, said abutment contacts said part of said shuttle and rotation of said spool is stopped.

17. A retractor mechanism according to claim 1, further comprising an intermediate plate positioned between said spool and said locking head, wherein said rotation-limiting device comprises a first projection connected to said locking head, a second projection connected to said intermediate plate and cooperating with said first projection, a third projection connected to said intermediate plate and a fourth projection connected to said spool and cooperating with said third projection, wherein upon rotation of said spool said fourth projection travels by a predetermined distance before engaging said third projection and entraining said intermediate plate, wherein said second projection upon rotation of said intermediate plate travels by a predetermined distance before engaging said first projection and stopping rotation of said spool relative to said locking head.

18. A retractor mechanism according to claim 17, wherein said intermediate plate is secured by a frangible element at said spool.

19. A retractor mechanism according to claim 1, wherein said end face of said spool has a receiving recess and wherein said rotation-limiting device comprises a ring positioned in said receiving recess, wherein said ring has first abutment means and wherein said receiving recess has second abutment means, wherein upon a predetermined rotation of said ring in said receiving recess said first abutment means engage said second abutment means, wherein said retractor mechanism further comprises clamping means clamping said ring to said locking head upon rotation of said spool relative to said locking head.

20. A retractor mechanism according to claim 19, wherein said clamping means comprise a plurality of peripheral recesses in an outer periphery of said locking head directly adjacent to said ring and further comprises a roller element in each one of said peripheral recesses, wherein each one of said peripheral recesses has at least one inclined wall, wherein upon rotation of said ring relative to said locking head at least one of said roller elements is moved into a constriction defined by said inclined wall and said ring.

21. A retractor mechanism according to claim 20, wherein said ring is comprised of two concentric ring elements, wherein a first one of said ring elements is positioned adjacent to said locking head and a second one of said ring elements is positioned adjacent to a wall of said receiving recess, wherein said first abutment means are provided at said second ring element and said second abutment means are provided at said wall of said receiving recess, wherein said second ring element has third abutment means facing said first ring element and said first ring element has fourth abutment means facing said second ring element, wherein said third and fourth abutment means engage one another upon rotation of said spool.

22. A retractor mechanism according to claim 1, wherein:
said end face of said spool has a recess;
said rotation-limiting device comprises a radially outwardly extending projection connected to said locking head and a radially inwardly extending projection connected to said recess and cooperating with said radially outwardly extending projection upon rotation of said spool relative to said locking head.

23. A retractor mechanism according to claim 21, further comprising an intermediate element positioned in a space between said locking head and a wall of said recess, wherein said radially outwardly extending projection is able to pass said radially inwardly extending projection upon rotation of said spool relative to said locking head, and wherein said intermediate element cannot pass said radially outwardly extending projection or said radially inwardly extending projection.

* * * * *